(12) United States Patent
Kim et al.

(10) Patent No.: US 7,815,979 B2
(45) Date of Patent: Oct. 19, 2010

(54) LIQUID CRYSTAL COMPOSITION AND LIQUID CRYSTAL DISPLAY INCLUDING SAME

(75) Inventors: Hyun-Wuk Kim, Yongin (KR); Jae-Jin Lyu, Yongin (KR); Jong-Ho Son, Seoul (KR); Myeong-Ha Kye, Seoul (KR); Min-Goo Seok, Yongin (KR); Sik-Young Jo, Chungcheongnam-do (KR)

(73) Assignee: Samsung Electronics Co., Ltd. (KR)

( * ) Notice: Subject to any disclaimer, the term of this patent is extended or adjusted under 35 U.S.C. 154(b) by 277 days.

(21) Appl. No.: 11/732,423

(22) Filed: Apr. 2, 2007

(65) Prior Publication Data

US 2007/0228330 A1 Oct. 4, 2007

Related U.S. Application Data

(60) Provisional application No. 60/789,417, filed on Apr. 4, 2006.

(30) Foreign Application Priority Data

Apr. 4, 2006 (KR) ............... 10-2006-0030552

(51) Int. Cl.
*C09K 19/30* (2006.01)
*C09K 19/12* (2006.01)

(52) U.S. Cl. ........... 428/1.1; 252/299.63; 252/299.66

(58) Field of Classification Search ............ 428/1.1, 428/1.3; 252/299.63, 299.66
See application file for complete search history.

(56) References Cited

U.S. PATENT DOCUMENTS

| | | | |
|---|---|---|---|
| 5,714,087 A | 2/1998 | Pausch et al. | |
| 5,904,876 A | 5/1999 | Ichinose et al. | |
| 6,376,030 B1 * | 4/2002 | Heckmeier et al. | 428/1.1 |
| 6,399,163 B1 | 6/2002 | Tomi et al. | |
| 6,764,723 B2 * | 7/2004 | Lee et al. | 428/1.1 |
| 6,896,939 B2 * | 5/2005 | Klasen-Memmer et al. | 428/1.1 |
| 6,929,832 B2 * | 8/2005 | Heckmeier et al. | 428/1.1 |
| 6,929,834 B2 * | 8/2005 | Klasen-Memmer et al. | 428/1.1 |
| 2003/0039769 A1 * | 2/2003 | Lee et al. | 428/1.1 |
| 2003/0095223 A1 * | 5/2003 | Song | 349/141 |
| 2003/0134055 A1 * | 7/2003 | Heckmeier et al. | 428/1.1 |
| 2003/0222245 A1 * | 12/2003 | Klasen-Memmer et al. | 252/299.66 |
| 2004/0011996 A1 * | 1/2004 | Klasen-Memmer et al. | 252/299.63 |
| 2004/0099842 A1 * | 5/2004 | Klasen-Memmer et al. | 252/299.62 |
| 2004/0227889 A1 * | 11/2004 | Kim | 349/139 |

FOREIGN PATENT DOCUMENTS

| | | |
|---|---|---|
| JP | 4-93393 | 3/1992 |
| JP | 8-3559 | 1/1996 |
| JP | 8-12605 | 1/1996 |
| JP | 8-259474 | 10/1996 |
| JP | 2005-314598 | 11/2005 |
| KR | 1996-7004005 | 8/1996 |
| KR | 1999-028300 | 4/1999 |
| KR | 10-0360488 | 10/2002 |

OTHER PUBLICATIONS

Patent Abstracts of Japan, Publication No. 04-093393, Mar. 26, 1992, 1 p.
Patent Abstracts of Japan, Publication No. 08-003559, Jan. 9, 1996, 1 p.
Patent Abstracts of Japan, Publication No. 08/012605, Jan. 16, 1996, 2 pp.
Patent Abstracts of Japan, Publication No. 08-259474, Oct. 8, 1996, 1 p.
Patent Abstracts of Japan, Publication No. 2005-314598, Nov. 10, 2005, 1 p.
Korean Patent Abstracts, Publication No. 100360488, Oct. 28, 2002, 1 p.

* cited by examiner

*Primary Examiner*—Shean C Wu
(74) *Attorney, Agent, or Firm*—Innovation Counsel LLP

(57) ABSTRACT

Disclosed is a liquid crystal display that includes a first substrate, a second substrate facing the first substrate, a pair of field generating electrodes formed on at least one of the first substrate and the second substrate, and a liquid crystal layer interposed between the first substrate and the second substrate. The liquid crystal layer comprises a liquid crystal composition that includes a first class having at least one fluorine atom, and a second class containing a neutral compound. The second class includes a first sub-class and a second sub-class. The first sub-class contains a liquid crystal compound having at least one selected from an alkyl group and an alkoxy group having C1 to C5 in a terminal group thereof. The second sub-class contains a liquid crystal compound having an alkenyl group having C1 to C5 in terminal groups thereof. The second sub-class is contained in a content of about 7 wt % or less of a total content of the liquid crystal composition.

5 Claims, 6 Drawing Sheets

LIQUID CRYSTAL COMPOSITION AND LIQUID CRYSTAL DISPLAY INCLUDING SAME

CROSS-REFERENCE TO RELATED APPLICATIONS

This application claims priority to and the benefit of Korean Patent Application No. 10-2006-0030552 filed in the Korean Intellectual Property Office on Apr. 4, 2006, and also claims priority to and the benefit of U.S. Provisional Application No. 60/789,417 filed in the United States Patent and Trademark Office on Apr. 4, 2006, the entire contents of which are incorporated herein by reference.

BACKGROUND OF THE INVENTION (a) Field of the Invention

The present invention relates to a liquid crystal composition and a liquid crystal display comprising the same.

(b) Description of the Related Art

Currently, a liquid crystal display (LCD) is the most widely used flat panel display. The LCD has two display panels in which field generating electrodes, such as pixel electrodes and a common electrode, are formed, and a liquid crystal layer that is interposed between the panels. In the LCD, a voltage is applied to the field generating electrodes so as to generate an electric field, and the alignment of liquid crystal molecules in the liquid crystal layer is determined by the electric field. Accordingly, transmittance of light passing through the liquid crystal layer is controlled.

In the LCD, the liquid crystal is very important to obtain a desired image by controlling transmittance of light. Particularly, with the diversification of use of the LCD, various characteristics such as low voltage driving, a high voltage holding ratio (VHR), a wide viewing angle characteristic, a wide operation temperature range, and a high speed response characteristic, are required.

A liquid crystal layer includes a liquid crystal composition in which various types of liquid crystal components are mixed so as to satisfy various characteristics described above.

However, in addition to the liquid crystal composition, a large content of ion impurities are contained in the liquid crystal layer. The ion impurities may be laterally transported along an electric field formed in the liquid crystal layer and concentrated at a predetermined portion, such as a boundary of a field generating electrode. In this case, the portion where the ion impurities are concentrated may be viewed as a residual image from the outside.

SUMMARY OF THE INVENTION

The present invention provides a liquid crystal composition and a liquid crystal display including the same, having an advantage of reducing a residual image of the liquid crystal display.

An embodiment of the present invention provides a liquid crystal composition comprising a first class including a liquid crystal compound having at least one fluorine atom, and a second class including at least one of the liquid crystal compounds represented by Formulae I, II, and III.

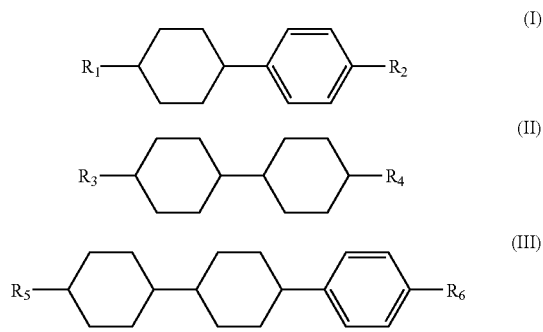

The liquid crystal compounds represented by Formulae I, II, and III have $R_1$ to $R_6$ as terminal groups, with each of $R_1$ to $R_6$ containing one of an alkyl group, an alkoxy group, and an alkenyl group having $C_1$ to $C_5$. The second class includes a first sub-class and a second sub-class. The first sub-class comprises a liquid crystal compound not having the alkenyl group in the terminal group thereof, and the second sub-class contains a liquid crystal compound having the alkenyl group in the terminal group thereof. The second sub-class is about 7 wt % or less of the total content of the first class and the second class in one example.

The first class may be about 40 to 80 wt % of the total content of the liquid crystal composition, and the second class may be about 20 to 60 wt % of the total content of the liquid crystal composition.

The first class may comprise at least one of the liquid crystal compounds represented by Formulae IV to X.

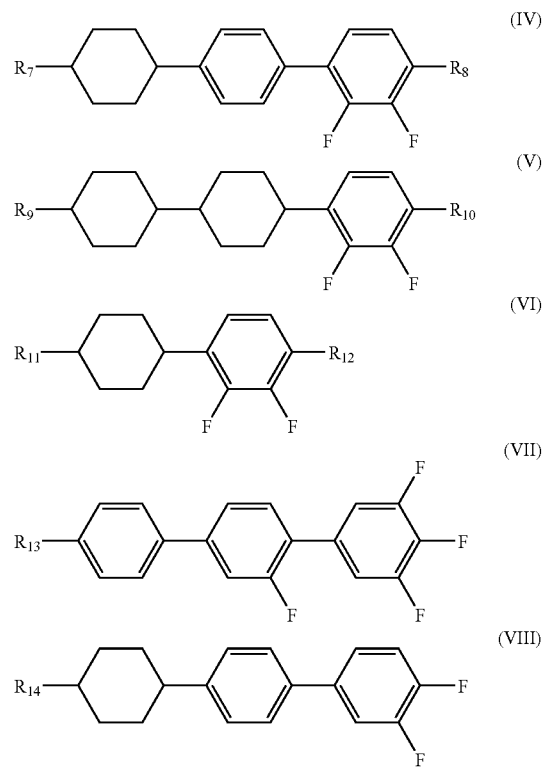

-continued

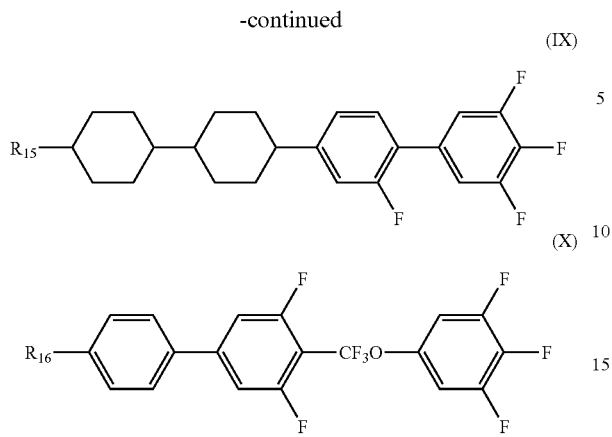

Each of $R_7$ to $R_{16}$ may include one selected from an alkyl group and an alkoxy group having $C_1$ to $C_5$.

Another embodiment of the present invention provides a liquid crystal composition including a first class comprising a liquid crystal compound having at least one fluorine atom, and a second class comprising at least one of the liquid crystal compounds represented by Formulae I, II, and III.

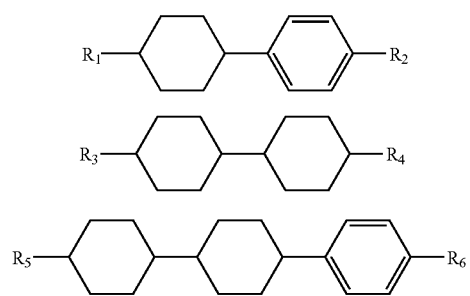

The liquid crystal compounds represented by Formulae I, II, and III have $R_1$ to $R_6$ as terminal groups, with each of $R_1$ to $R_6$ containing an alkyl group or an alkoxy group having $C_1$ to $C_5$, and the second class not comprising the liquid crystal compound having an alkenyl group in the terminal group thereof.

The first class may be about 40 to 80 wt % of the total content of the liquid crystal composition, and the second class may be about 20 to 60 wt % of the total content of the liquid crystal composition.

The first class may comprise at least one of the liquid crystal compounds represented by Formulae IV to X.

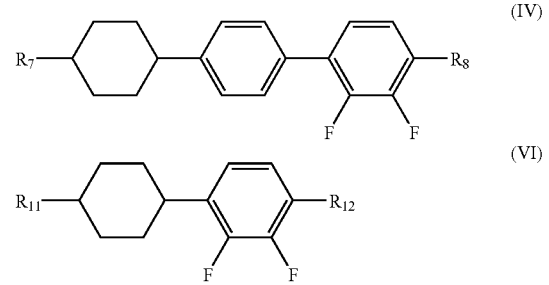

-continued

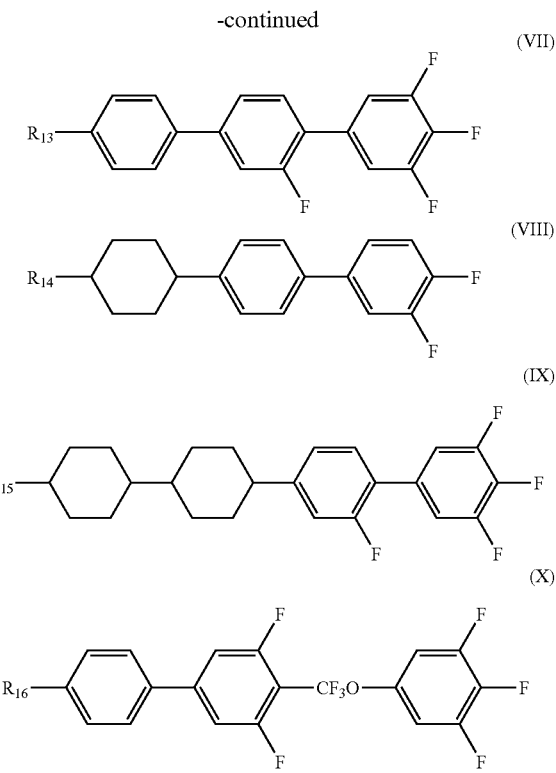

Each of $R_7$ to $R_{16}$ may contain one selected from an alkyl group and an alkoxy group having $C_1$ to $C_5$ carbon atoms.

Yet another embodiment of the present invention provides a liquid crystal display including a first substrate, a second substrate facing the first substrate, a pair of field generating electrodes formed on at least one of the first substrate and the second substrate, and a liquid crystal layer interposed between the first substrate and the second substrate. The liquid crystal layer comprises a liquid crystal composition that includes a first class comprising a liquid crystal compound having at least one fluorine atom, and a second class comprising at least one of the liquid crystal compounds represented by Formulae I, II, and III.

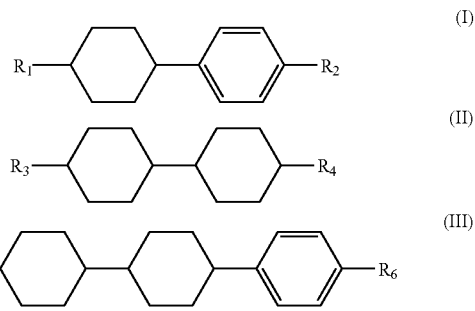

The liquid crystal compounds represented by Formulae I, II, and III have $R_1$ to $R_6$ as terminal groups, with each of $R_1$ to $R_6$ containing one selected from an alkyl group, an alkoxy group, and an alkenyl group having $C_1$ to $C_5$. The second class comprises a first sub-class and a second sub-class. The first sub-class contains a liquid crystal compound not having the alkenyl group in the terminal group thereof, and the second sub-class contains a liquid crystal compound having the alkenyl group in the terminal group thereof. The second sub-class is about 7 wt % or less of the total content of the first class and the second class in one example.

The first class may be about 40 to 80 wt % of the total content of the liquid crystal composition, and the second class may be about 20 to 60 wt % of the total content of the liquid crystal composition in one example.

The first class may contain at least one of liquid crystal compounds represented by Formulae IV to X.

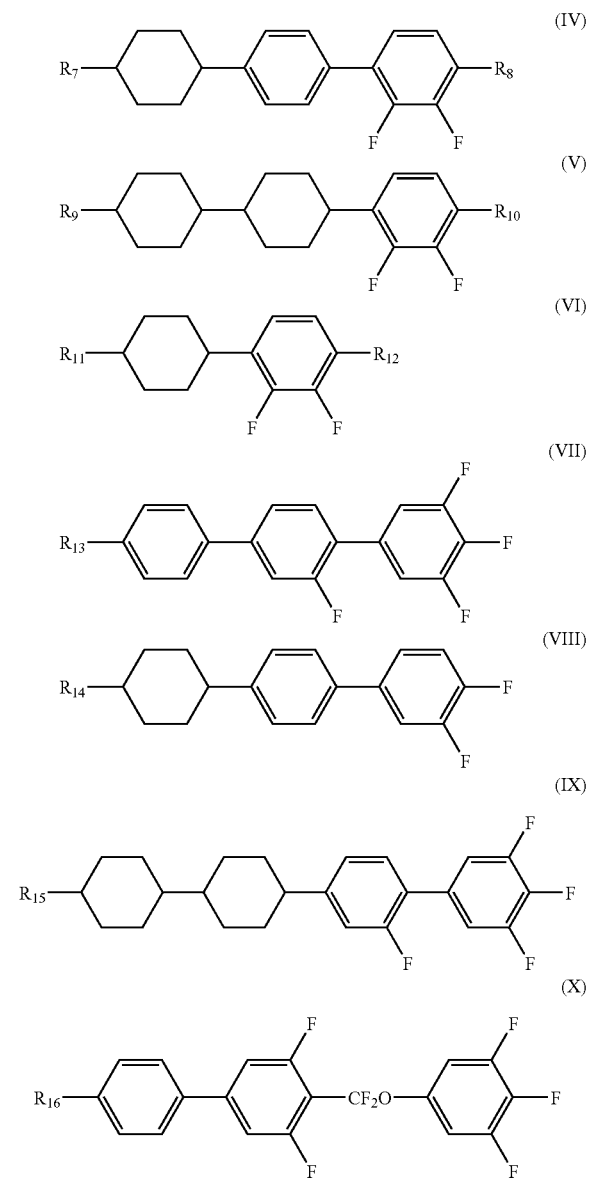

Each of $R_7$ to $R_{16}$ may contain one selected from an alkyl group and an alkoxy group having $C_1$ to $C_5$ carbon atoms.

The liquid crystal display may further include first and second signal lines that intersect on the first substrate, and thin film transistors that are connected to the first and second signal lines.

The liquid crystal display may further include an inclination direction determining member for determining an inclination direction of the liquid crystal compound in the liquid crystal layer. The inclination direction determining member may include a cutout formed in a field generating electrode or a protrusion formed on the field generating electrode in one example.

According to an embodiment of the present invention, a liquid crystal display includes a first substrate, a second substrate facing the first substrate, a pair of field generating electrodes formed on at least one of the first substrate and the second substrate, and a liquid crystal layer interposed between the first substrate and the second substrate. The liquid crystal layer comprises a liquid crystal composition that includes a first class comprising a liquid crystal compound having at least one fluorine atom, and a second class comprising a liquid crystal compound shown in Formulae I, II, or III.

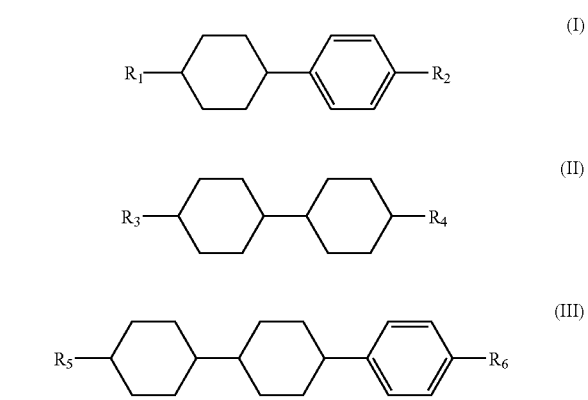

The liquid crystal compounds shown in Formulae I, II, and III have $R_1$ to $R_6$ as terminal groups, with each of $R_1$ to $R_6$ containing an alkyl group or an alkoxy group having $C_1$ to $C_5$, and the second class not comprising the liquid crystal compound having an alkenyl group in a terminal group thereof.

The first class may be about 40 to 80 wt % of the total content of the liquid crystal composition, and the second class may be about 20 to 60 wt % of the total content of the liquid crystal composition.

The first class may contain at least one of liquid crystal compounds shown in Formulae IV to X.

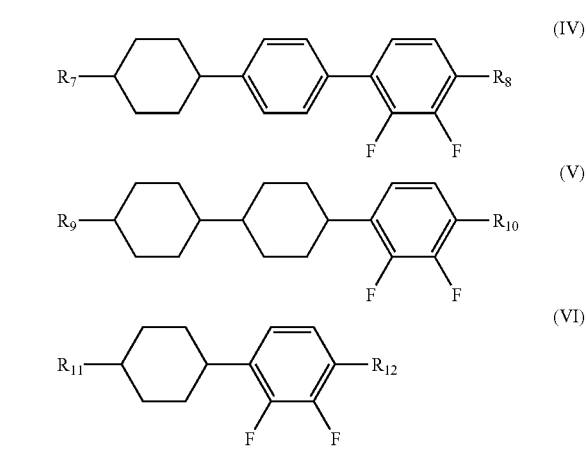

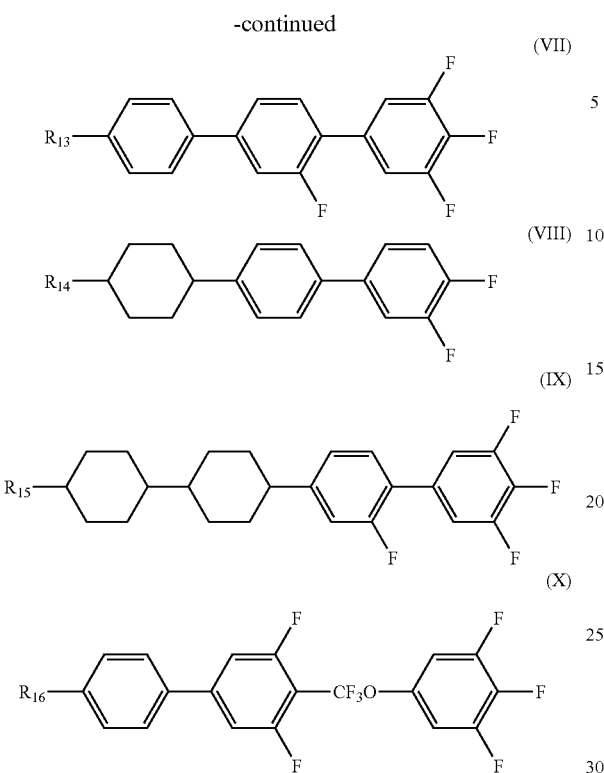

Each of $R_7$ to $R_{16}$ may contain one selected from an alkyl group and an alkoxy group having $C_1$ to $C_5$.

The liquid crystal display may further include first and second signal lines that intersect on the first substrate, and thin film transistors that are connected to the first and second signal lines.

The liquid crystal display may further include an inclination direction determining member for determining an inclination direction of the liquid crystal compound in the liquid crystal layer. The inclination direction determining member may include a cutout formed in a field generating electrode or a protrusion formed on the field generating electrode in one example.

DETAILED DESCRIPTION OF THE EMBODIMENTS

Figure 1:
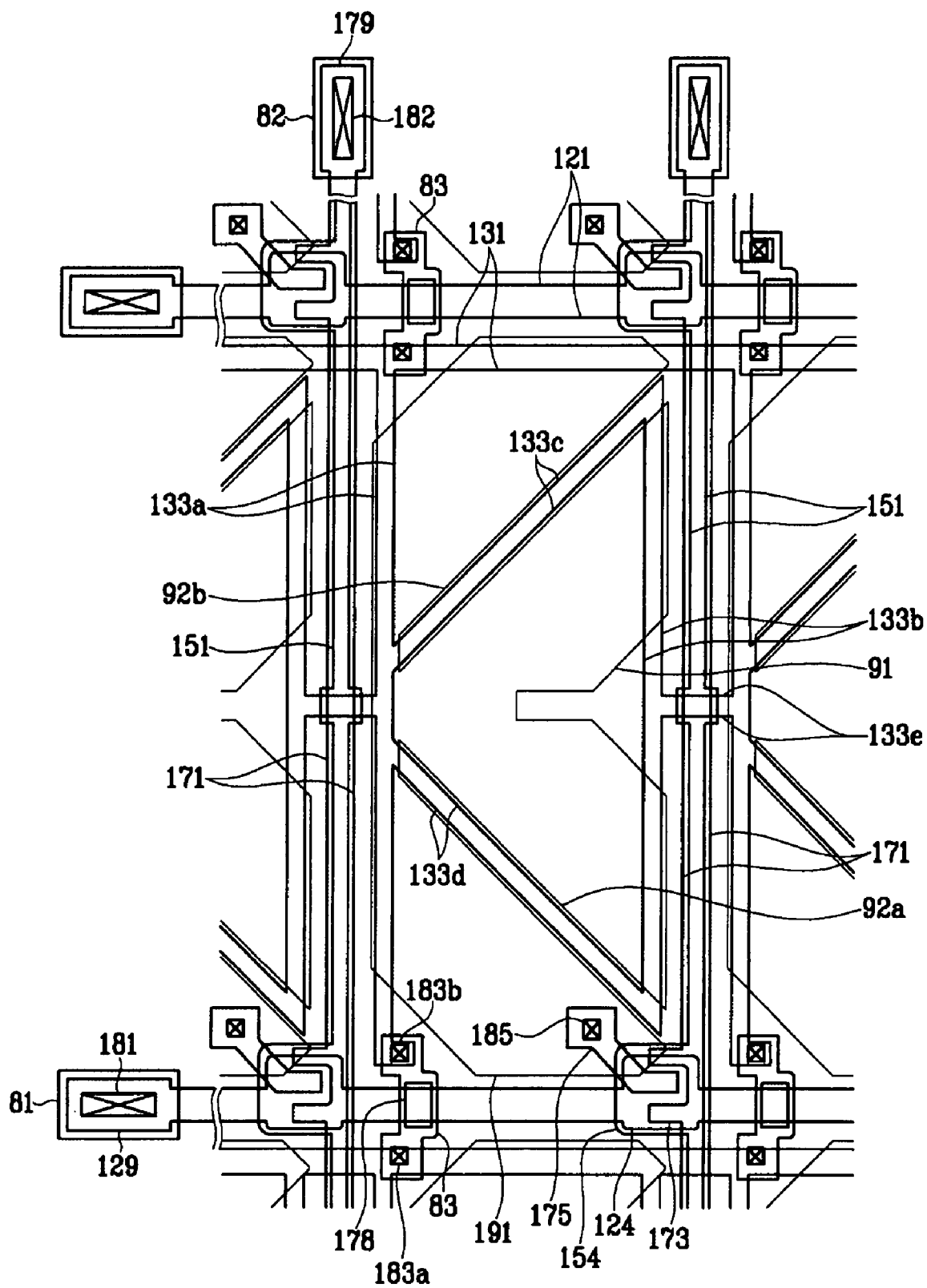
FIG. 1 is a layout view of a thin film transistor array panel for a liquid crystal display according to an embodiment of the present invention.

Hereinafter, a description will be given for a liquid crystal composition according to an embodiment of the present invention. The liquid crystal composition contains various types of liquid crystals having different physical properties. The liquid crystal includes a core group forming a center axis, and a terminal and/or lateral group connected to the core group. The core group may include cyclic compounds selected from phenyl groups, cyclohexyl groups, and heterocycles. The terminal group and/or the lateral group may include a non-polar group such as an alkyl group, an alkoxy group, and an alkenyl group, or a polar group such as a fluorine atom (F), and the physical properties thereof depend on the terminal group and/or the lateral group.

The liquid crystal composition according to an embodiment of the present invention includes: 1) a neutral compound not having dielectric anisotropy, and 2) a fluorine-containing compound having dielectric anisotropy.

The neutral compound may contain one or more liquid crystal compounds selected from the following Chemical Formulae I to III:

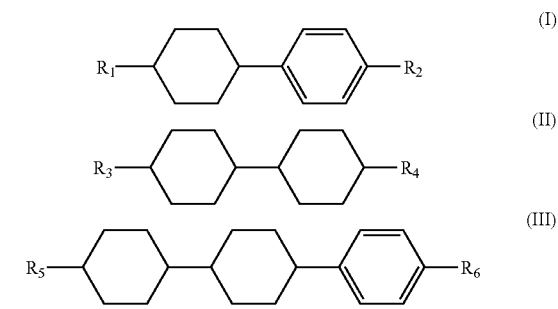

In the above-mentioned Formulae, each of $R_1$ to $R_6$ may be the same or different, and may contain one selected from an alkyl group, an alkoxy group, or an alkenyl group having $C_1$ to $C_5$, respectively. When at least one of $R_1$ to $R_6$ contains the alkenyl group, it is preferable that the compound containing the alkenyl group be included in a content of about 7 wt % or less of the total content of the liquid crystal composition. Furthermore, it is most preferable that $R_1$ to $R_6$ do not contain the alkenyl group. The neutral compound may be contained in a content of about 20 to 60 wt % of the total content of the liquid crystal composition, in one example.

The fluorine-containing compound may be one or more selected from the following Formulae IV to X:

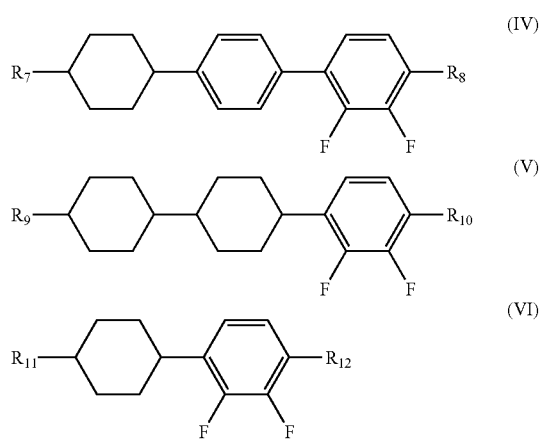

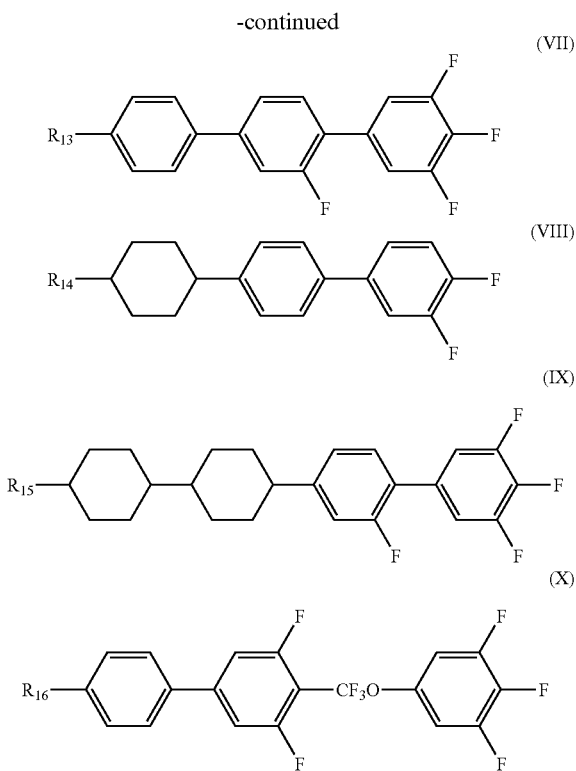

In the above-mentioned Formulae, each of $R_7$ to $R_{16}$ may be the same or different, and may contain one selected from the alkyl group or the alkoxy group having $C_1$ to $C_5$. The fluorine-containing compound may be contained in a content of about 40 to 80 wt % of the total content of the liquid crystal composition in one example.

As described above, in an embodiment of the present invention, the content of the neutral compound having the alkenyl group in the terminal group thereof is limited. That is, the liquid crystal composition does not include the neutral compound containing the alkenyl group in the terminal group thereof in one example, or if it does, the liquid crystal composition includes the neutral compound containing the alkenyl group in the terminal group at about 7 wt % or less of the total content of the liquid crystal composition in another example.

When the neutral compound contains the alkenyl group in the terminal group thereof, the position of a double-bond of the alkenyl group may be a reaction site of an ion impurity. Accordingly, the ion impurity may be combined at the terminal group of the neutral compound and remains even after the liquid crystal composition is prepared. The ion impurity is laterally transported along an electric field formed in a liquid crystal layer during driving of the LCD to be positioned at a predetermined portion, such as a boundary of a field generating electrode. If the ion impurity is combined to the liquid crystal molecule, refractive anisotropy is changed, which causes occurrence of a line residual image.

Therefore, in an embodiment of the present invention, the content of the neutral compound having the alkenyl group in the terminal group thereof is set to reduce the reaction with the ion impurity. Accordingly, a change in refractive anisotropy of the liquid crystal composition due to the ion impurity may be reduced so as to improve a line residual image characteristic.

The line residual image can be evaluated by the following process.

First, test displays that include two panels with field generating electrodes and a liquid crystal layer interposed therebetween are prepared. A plurality of pixels are disposed in the test display. Among the plurality of pixels, some pixels are disposed horizontally and vertically in turn and are represented by black and the others by white to set latticed black/white patterns. Next, after a predetermined time, the black/white patterns are removed, and it is checked whether line-shaped stains are recognized at the boundaries of each pixel while changing the entire test display with uniform gray levels from black to white. The time until the line-shaped stain is visible (hereinafter, referred to as a "line residual image revelation time") is measured. The line residual image revelation time is an index that shows how long the LCD is driven without the line residual image. The longer the line residual image revelation time is, the better a line residual image characteristic is.

Figure 6:
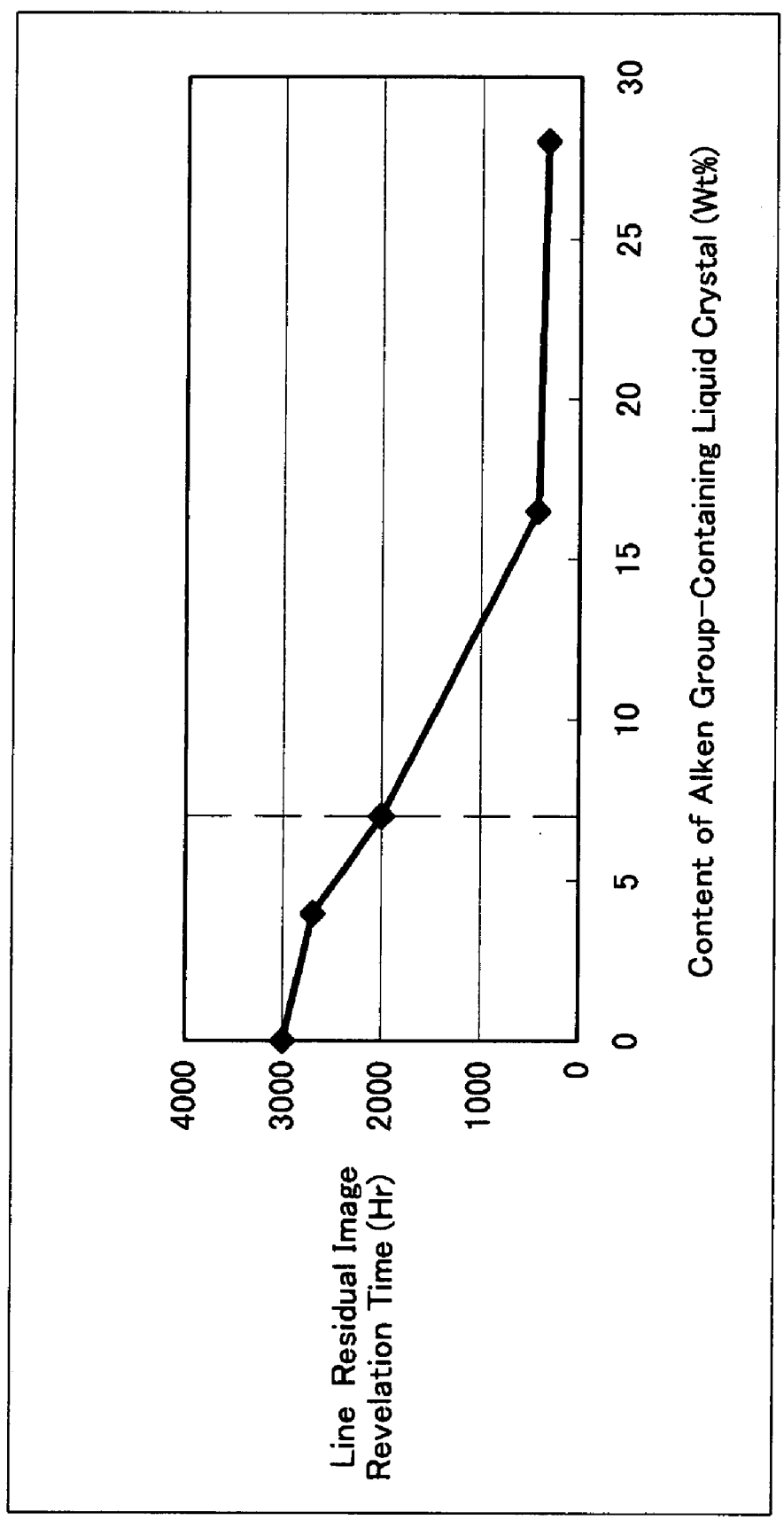
FIG. 6 is a graph showing the result of line residual image evaluation.

FIG. 6 is a graph showing the result of a line residual image evaluation.

In the graph, an x axis is a ratio of the neutral compound having the alkenyl group in the terminal group thereof to the total content of the liquid crystal composition, and a y axis is the line residual image revelation time.

As shown in the graph, when there is no neutral compound having the alkenyl group in the terminal group thereof, that is, when the ratio of the neutral compound having the alkenyl group in the terminal group thereof to the total content of the liquid crystal composition (as shown on the x axis) is 0, the line residual image revelation time is about 3000 hours.

Meanwhile, the line residual image revelation time is significantly reduced as the content of the neutral compound having the alkenyl group in the terminal group thereof increases. Particularly, when the content of the neutral compound having the alkenyl group in the terminal group thereof exceeds about 7 wt %, it has been confirmed that the line residual image revelation time is reduced to less than about 2000 hours.

As described above, in an embodiment of the present invention, when the neutral compound having the alkenyl group in the terminal group thereof is contained in the content of about 7 wt % or less of the total content of the liquid crystal composition, it is possible to assure the line residual image revelation time of about 2000 hours or more. It is preferable that the neutral compound be contained in a content of about 4 wt % or less, and it is most preferable that the neutral compound having the alkenyl group in the terminal group thereof is not included.

Additionally, it has been confirmed that the liquid crystal composition according to an embodiment of the present invention has a high line residual image revelation time and also has desirable dielectric anisotropy, refractive anisotropy, and rotational viscosity characteristics.

In one example, the liquid crystal composition that has the positive dielectric anisotropy has the dielectric anisotropy ($^\Delta\in$) of about +3 to +20, the refractive anisotropy ($^\Delta$n) of about 0.060 to 0.180, and the rotational viscosity of about 50 to 250 mPa·s, and the liquid crystal composition that has the negative dielectric anisotropy has the dielectric anisotropy of about −2.7 to −5.8, the refractive anisotropy of about 0.075 to 0.109, and the rotational viscosity of about 87 to 165 mPa·s.

Hereinafter, an embodiment of the present invention will be described in detail with reference to the accompanying drawings such that the present invention can be easily accomplished by those skilled in the art. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present. Now, a detailed description will be given for the liquid crystal display according to an embodiment of the present invention with reference to FIGS. 1 to 5.

Figure 2:
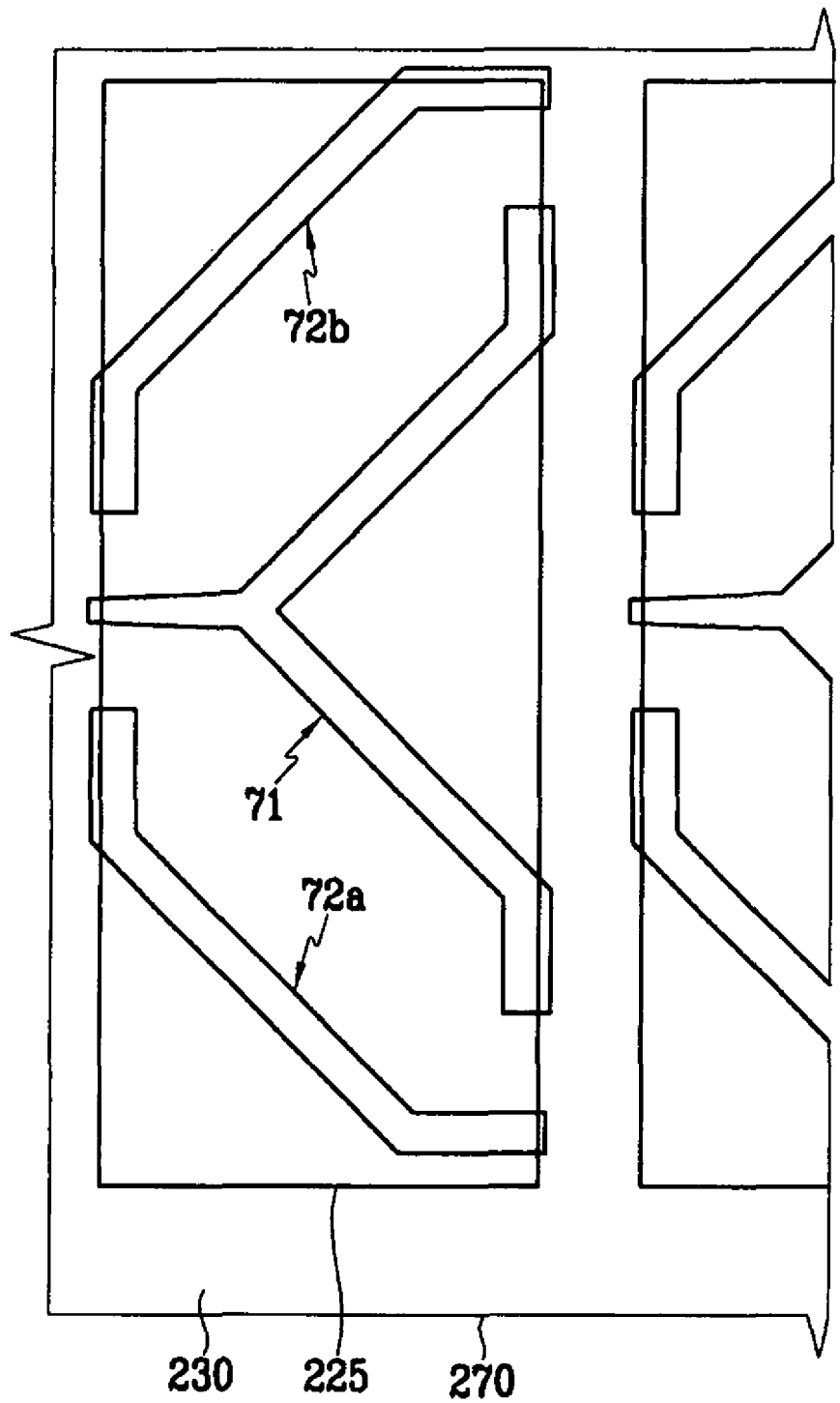
FIG. 2 is a layout view of a common electrode panel for a liquid crystal display according to the embodiment of the present invention.
Figure 3:
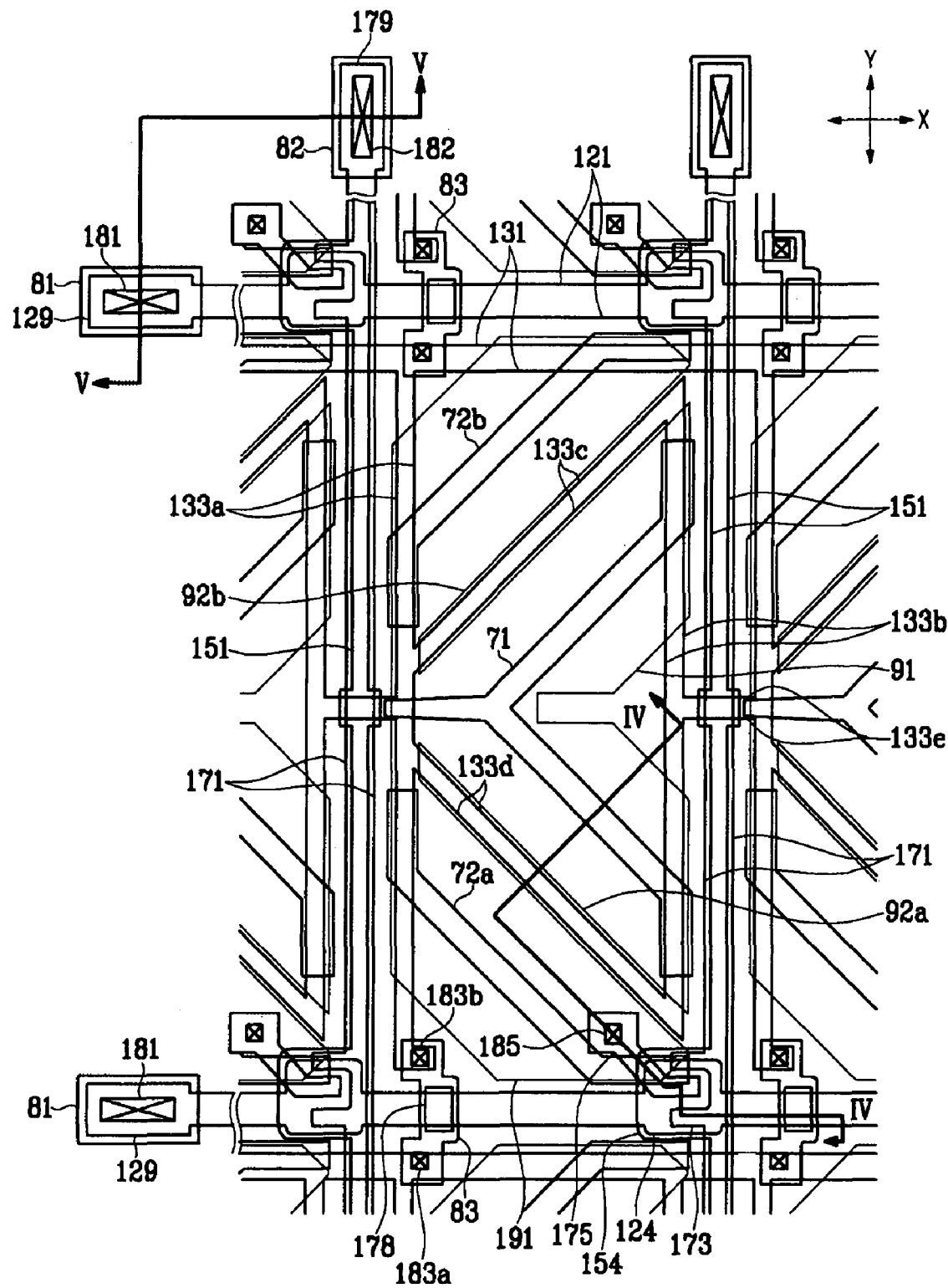
FIG. 3 is a layout view of a liquid crystal display that includes the thin film transistor array panel of FIG. 1 and the common electrode panel of FIG. 2.
Figure 4:
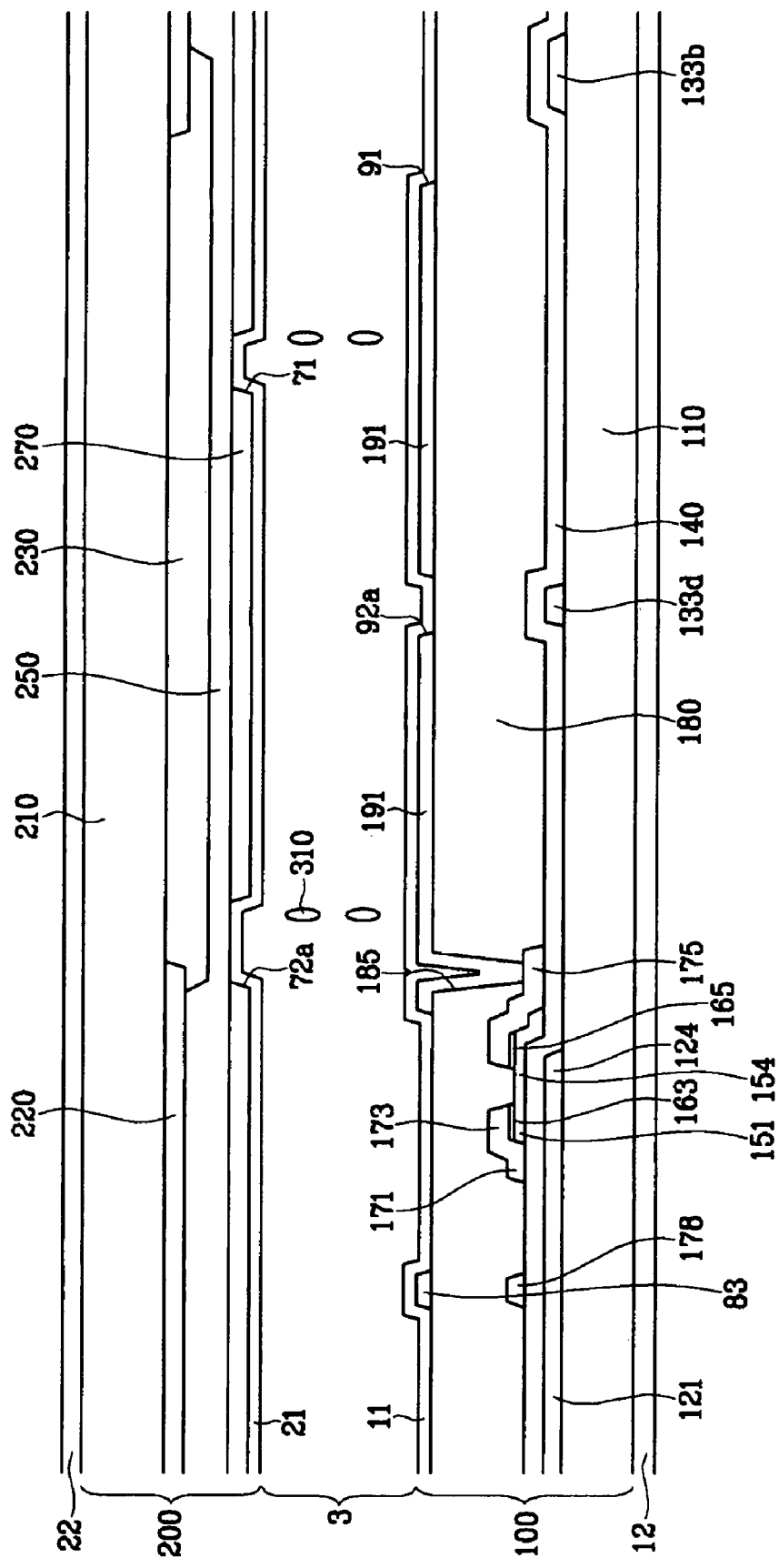
FIGS. 4 and 5 are cross-sectional views of the liquid crystal display of FIG. 3 taken along the lines IV-IV and V-V, respectively.
Figure 5:
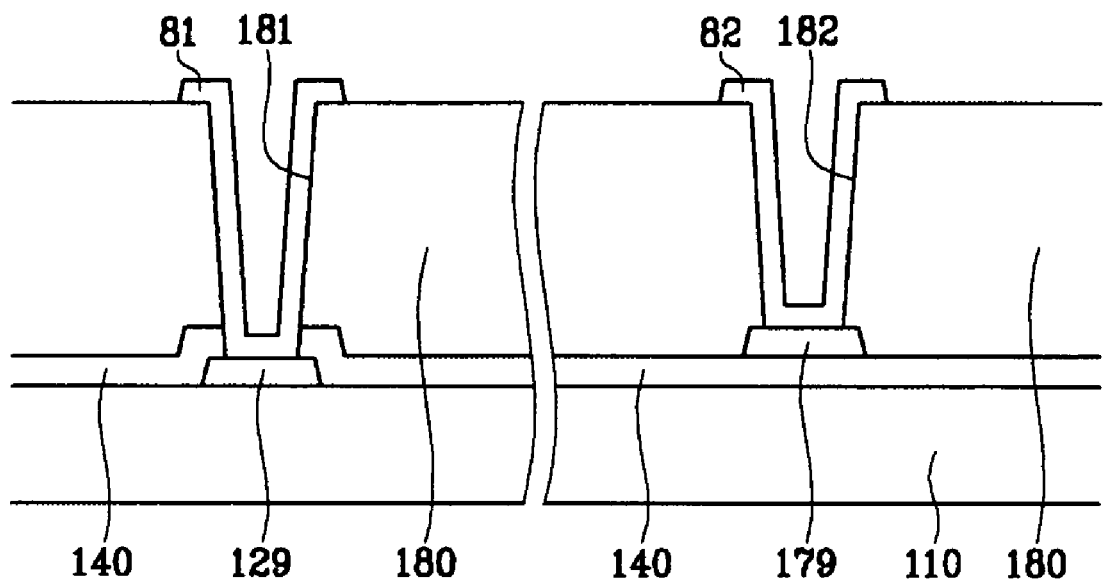

FIG. 1 is a layout view of a thin film transistor array panel for a liquid crystal display according to an embodiment of the present invention, FIG. 2 is a layout view of a common electrode panel for a liquid crystal display according to an embodiment of the present invention, FIG. 3 is a layout view of a liquid crystal display that includes the thin film transistor array panel of FIG. 1 and the common electrode panel of FIG. 2, and FIGS. 4 and 5 are cross-sectional views of the liquid crystal display of FIG. 3 taken along the lines IV-IV and V-V, respectively.

Referring to FIGS. 1 to 5, the LCD according to an embodiment of the present invention includes a thin film transistor array panel 100 (FIG. 4) and a common electrode panel 200 (FIG. 4) facing each other, and a liquid crystal layer 3 (FIG. 4) interposed between the two panels 100 and 200.

First, the thin film transistor array panel 100 will be described with reference to FIGS. 1, 3, 4, and 5.

A plurality of gate lines 121 and a plurality of storage electrode lines 131 are formed on an insulating substrate 110 formed of, for example, transparent glass or plastic.

The gate lines 121 transmit gate signals, and substantially extend in a horizontal direction. Each of the gate lines 121 includes a plurality of gate electrodes 124 protruding upward and an end portion 129 having a wide end for connection to other layers or external driving circuits. A gate driving circuit (not shown) that generates gate signals may be provided on a flexible printed circuit film (not shown) to be attached to a substrate 110, may be directly provided on the substrate 110, or may be integrated on the substrate 110. When the gate driving circuit is integrated on the substrate 110, the gate line 121 may extend to be directly connected to the gate driving circuit.

A predetermined voltage is applied to the storage electrode lines 131, and each of the storage electrode lines 131 includes a stem line extending almost parallel to the gate line 121, and a plurality of first, second, third, and fourth storage electrodes 133a, 133b, 133c, and 133d and a plurality of connections 133e branched from the stem line. Each of the storage electrode lines 131 is provided between two adjacent gate lines 121, and the stem line is closer to the upper one of the two adjacent gate lines 121.

The first and second storage electrodes 133a and 133b extend in a vertical direction so as to face each other. The first storage electrode 133a has a fixed end that is connected to the stem line and a free end opposite to the fixed end. The fixed end has a projection. The third and fourth storage electrodes 133c and 133d obliquely extend from the center of the first storage electrode 133a to upper and lower ends of the second storage electrode 133b, respectively. The connection 133e is connected between adjacent storage electrodes 133a to 133d. However, the shape and arrangement of the storage electrode lines 131 may be modified in various ways.

The gate lines 121 and the storage electrode lines 131 may be made of a conductor having low resistance, for example an aluminum-containing metal such as aluminum (Al) or an aluminum alloy, a silver-containing metal such as silver (Ag) or a silver alloy, a copper-containing metal such as copper (Cu) or a copper alloy, a molybdenum-containing metal such as molybdenum (Mo) or a molybdenum alloy, chromium (Cr), tantalum (Ta), or titanium (Ti). Further, the gate lines 121 and the storage electrode lines 131 may have a multilayer structure including two conductive layers (not shown) whose physical properties are different from each other.

Side surfaces of the gate lines 121 and the storage electrode lines 131 are inclined with respect to a surface of the substrate 110, and an inclination angle thereof is preferably in a range of about 30° to 80° in one example.

On the gate line 121 and the storage electrode line 131, a gate insulating layer 140 that is made of silicon nitride ($SiN_x$) or silicon oxide ($SiO_2$) is formed.

On the gate insulating layer 140, a plurality of semiconductor stripes 151 that are made of hydrogenated amorphous silicon (abbreviated as hydrogenated a-Si) or polysilicon are formed. The semiconductor stripes 151 substantially extend in a vertical direction and have a plurality of projections 154 that protrude toward the gate electrodes 124.

A plurality of ohmic contact stripes (not shown) and islands 165 are formed on the semiconductor stripes 151. Each of the ohmic contact stripes has a plurality of projections 163, and the projections 163 and the ohmic contact islands 165 are disposed on the projection 154 of the semiconductor stripe 151 in pairs. The ohmic contacts 163 and 165 may be made of a material such as n+ hydrogenated a-Si that is heavily doped with an n-type impurity such as phosphorous (P), or of silicide.

The side surfaces of the semiconductor stripes 151 and the ohmic contacts 163 and 165 are also inclined with respect to the surface of the substrate 110, and the inclination angle thereof is in a range of about 30° to 80° in one example.

On the ohmic contacts 163 and 165 and the gate insulating layer 140, a plurality of data lines 171, a plurality of drain electrodes 175, and a plurality of isolated metal pieces 178 are formed.

The data lines 171 transmit data signals, and substantially extend in a vertical direction to intersect the gate lines 121, the stem line of the storage electrode lines 131, and the connections 133e. Each of the data lines 171 has a plurality of source electrodes 173 that extend toward the gate electrodes 124 and a wide end portion 179 for connection to the other layers or external driving circuits. A data driving circuit (not shown) that generates a data voltage may be provided on a flexible printed circuit film (not shown) to be attached to the substrate 110, may be directly provided on the substrate 110, or may be integrated on the substrate 110. When the data driving circuit is integrated on the substrate 110, the data lines 171 may be directly connected to the data driving circuit.

The drain electrodes 175 are formed to be separated from the data lines 171, and face the source electrodes 173 with the gate electrodes 124 interposed therebetween. Each of the drain electrodes 175 has a wide end and a rod type end that is surrounded by the source electrode 173.

One gate electrode 124, one source electrode 173, and one drain electrode 175 form a single thin film transistor (TFT) along with the projection 154 of the semiconductor stripe 151, and a channel of the thin film transistor is formed on the projection 154 between the source electrode 173 and the drain electrode 175.

The isolated metal piece 178 is disposed on the gate line 121 in the vicinity of the first storage electrode 133a.

Like the gate lines 121, the data lines 171, the drain electrodes 175, and the isolated metal pieces 178 may be made of a conductor having low resistance.

Side surfaces of the data lines 171, the drain electrodes 175, and the isolated metal pieces 178 are also inclined with respect to the surface of the substrate 110, and the inclination angle thereof is preferably in a range of about 30° to 80° in one example.

The ohmic contacts 163 and 165 are formed only between the underlying semiconductor stripe 151, and the overlying data lines 171 and drain electrodes 175, thereby reducing contact resistance therebetween.

A passivation layer 180 is formed on the data lines 171, the drain electrodes 175, the isolated metal pieces 178, and an exposed portion of the semiconductor stripes 151. The passivation layer 180 may be made of an inorganic insulator or an organic insulator. The surface thereof may be planarized. Examples of the inorganic insulator include silicon nitride and silicon oxide. The organic insulator may have photosensitivity, and it is preferable that the dielectric constant is about 4.0 or less. The passivation layer 180, however, may have a double layer structure of an inorganic lower layer and an organic upper layer so as to have an excellent insulating characteristic of the dielectric layer without damaging the exposed portion of the semiconductor stripes 151.

A plurality of pixel electrodes 191, a plurality of overpasses 83, and a plurality of contact assistants 81 and 82 are formed on the passivation layer 180. The pixel electrodes 191, the overpasses 83, and the contact assistants 81 and 82 may be made of a transparent conductive material such as indium tin oxide (ITO) or indium zinc oxide (IZO), or a reflective metal such as Al, Ag, Cr, or alloys thereof.

The pixel electrode 191 is physically and electrically connected to the drain electrode 175 through a contact hole 185, and the data voltage is applied from the drain electrode 175 to the pixel electrode 191. The pixel electrode 191 applied with the data voltage forms an electric field along with the common electrode 270 of the common electrode panel 200 applied with the common voltage, thereby determining the orientation of liquid crystal molecules 310 of the liquid crystal layer 3 interposed between the two electrodes 191 and 270. The polarization of light passing through the liquid crystal layer 3 varies depending on the determined orientation of the liquid crystal molecules 310. The pixel electrode 191 and the common electrode 270 form a capacitor (hereinafter referred to as "liquid crystal capacitor") to maintain the applied voltage even after the thin film transistor is turned off.

The pixel electrode 191 overlaps the storage electrode line 131 including the storage electrodes 133a to 133d. The pixel electrode 191 and the drain electrode 175 that is electrically connected to the pixel electrode 191 overlap the storage electrode line 131 to form a capacitor. This capacitor is referred to as a "storage capacitor". The storage capacitor improves a voltage-maintaining property of the liquid crystal capacitor.

Each of the pixel electrodes 191 has four main sides that are substantially parallel to the gate lines 121 or the data lines 171, and four corners thereof are chamfered. Thus, the pixel electrode is almost rectangular. The angle of each of the chamfered sides of the pixel electrode 191 is about 45° with respect to the gate lines 121 in one example. The pixel electrode 191 has a center cutout 91, a lower cutout 92a, and an upper cutout 92b, and is divided into a plurality of partitions by the cutouts 91 to 92b. The cutouts 91 to 92b are substantially inversely symmetric to an imaginary horizontal center line that bisects the pixel electrode 191.

The lower and upper cutouts 92a and 92b obliquely extend between the right and left sides of the pixel electrode 191 and overlap the third and fourth storage electrodes 133c and 133d. The lower and upper cutouts 92a and 92b are positioned in lower and upper portions with respect to the horizontal center line of the pixel electrode 191, respectively. The lower and upper cutouts 92a and 92b are perpendicular to each other and are formed at about 45° with respect to the gate line 121.

The center cutout 91 extends along the horizontal center line of the pixel electrode 191 and has an opening formed on the right side thereof. The opening of the center cutout 91 has a pair of oblique sides that are substantially parallel to the lower cutout 92a and the upper cutout 92b. The center cutout 91 has horizontal portions and a pair of oblique portions connected to the horizontal portions. The horizontal portions extend short along the horizontal center line of the pixel electrode 191, and a pair of oblique portions extend from the horizontal portions to the right side of the pixel electrode 191 to be substantially parallel to the lower cutout 92a and the upper cutout 92b.

Accordingly, the lower portion of the pixel electrode 191 is divided into two regions by the lower cutout 92a, and the upper portion thereof is divided into two regions by the upper cutout 92b. The number of regions or cutouts varies depending on design factors, such as the size of the pixel electrode 191, the length ratio of the horizontal side and the vertical side of the pixel electrode 191, the type or characteristics of the liquid crystal layer 3, and the like.

The overpass 83 intersects the gate line 121 and is connected to the exposed portion of the storage electrode 131 and the exposed end of the free end of the first storage electrode 133 through contact holes 183a and 183b that are opposite to each other with the gate lines 121 therebetween. The storage electrodes 133a and 133b, the storage electrode lines 131, and the overpasses 83 may be used to repair defects of the gate lines 121, the data lines 171, or the thin film transistors.

The contact assistants 81 and 82 are connected to the end portions 129 of the gate lines 121 and the end portions 179 of the data lines 171 through contact holes 181 and 182, respectively. The contact assistants 81 and 82 complement the attachment of the end portions 129 of the gate lines 121 and the end portions 179 of the data lines 171 to the external devices, and protect them.

Next, with reference to FIGS. 2 to 4, the common electrode panel 200 will be described.

A light blocking member 220 is formed on an insulation substrate 210 formed of transparent glass or plastic in one example. The light blocking member 220 is referred to as a black matrix, and prevents light leakage between the pixel electrodes 191. The light blocking member 220 faces the pixel electrode 191 and has a plurality of openings 225 that substantially have the same shape as the pixel electrodes 191. The light blocking member 220, however, may have portions corresponding to the gate lines 121 and the data lines 171, and portions corresponding to the thin film transistors.

Further, a plurality of color filters 230 are formed on the substrate 210. Most of the color filters 230 are disposed in a region surrounded by the light blocking member 220, and may extend along the column of the pixel electrodes 191 in a vertical direction. Each of the color filters 230 can display one of three primary colors, such as red, green, and blue.

An overcoat 250 is formed on the color filters 230 and the light blocking member 220. The overcoat 250 may be made of an (organic) insulating member, and it prevents the color filters 230 from being exposed to the outside and provides a flat surface. The overcoat 250 is optional and may be omitted.

A common electrode 270 is formed on the overcoat 250. The common electrode 270 is made of a transparent conductor such as ITO or IZO, and a plurality of cutouts 71, 72a, 72b are formed in the common electrode 270.

A group of cutouts 71 to 72b face one pixel electrode 191 and includes a center cutout 71, a lower cutout 72a, and an upper cutout 72b. Each of the cutouts 71 to 72b is disposed between adjacent cutouts 91 to 92b of the pixel electrode 191 or between cutouts 92a and 92b and chamfered sides of the pixel electrode 191. Further, each of the cutouts 71 to 72b has at least one oblique portion that substantially extends parallel to the lower cutout 92a or the upper cutout 92b of the pixel electrode 191. The cutouts 71 to 72b are substantially inversely symmetric to the horizontal center line of the pixel electrode 191.

The lower and upper cutouts 72a and 72b have oblique portions, horizontal portions, and vertical portions. The oblique portions substantially extend from upper sides or lower sides of the pixel electrode 191 to left sides of the pixel electrodes. The horizontal portions and the vertical portions extend along the sides of the pixel electrode 191 from ends of the oblique portions while overlapping the sides of the pixel electrode and are formed at an obtuse angle with the oblique portions.

The center cutout 71 has center horizontal portions, a pair of oblique portions, and a pair of longitudinal vertical portions. The center horizontal portions substantially extend along the horizontal center line of the pixel electrode 191 from the left side of the pixel electrode 191 to the right side thereof. The pair of oblique portions are formed at an obtuse angle with respect to the center horizontal portions from ends of the center horizontal portions to the right side of the pixel electrode 191, and substantially extend parallel to the lower and upper cutouts 72a and 72b. The longitudinal vertical portions extend along the right sides of the pixel electrode 191 from the ends of the corresponding oblique portions to overlap the right sides, and are formed at an obtuse angle with respect to the oblique portions.

The number of cutouts 71 to 72b may vary depending on design factors. The light blocking member 220 may overlap the cutouts 71 to 72b to prevent light leakage around the cutouts 71 to 72b.

When the common voltage is applied to the common electrode 270 and the data voltage is applied to the pixel electrode 191, an electric field that is substantially perpendicular to the surfaces of the display panels 100 and 200 is generated. In response to the electric field, the orientation of the liquid crystal molecules 310 is changed such that the major axes of the liquid crystal molecules 310 are perpendicular to the orientation of the electric field.

The cutouts 71 to 72b and 91 to 92b in the field generating electrodes 191 and 270 and the sides of the pixel electrode 191 deform the electric field so as to generate a horizontal component that determines the inclination direction of the liquid crystal molecules 310. The horizontal component of the electric field is substantially perpendicular to the sides of the cutouts 71 to 72b and 91 to 92b and the sides of the pixel electrode 191.

Referring to FIG. 3, one group of cutouts 71 to 72b and 91 to 92b divide the pixel electrode 191 into a plurality of sub-domains, and each of the respective sub-domains has two primary edges that are formed at an oblique angle with a primary edge of the pixel electrode 191. The primary edges of the sub-areas and polarization axes of polarizers 12 and 22 are formed at approximately 45°, which maximizes optical efficiency.

Since most of the liquid crystal molecules 310 in the sub-domains are formed to be perpendicular to the primary edges, the inclination directions are approximately four. Accordingly, with various directions of the liquid crystal molecules 310, a reference viewing angle of the LCD increases.

The shapes and arrangement of the cutouts 71 to 72b and 91 to 92b may be modified in various ways.

At least one of the cutouts 71 to 72b and 91 to 92b may be replaced with a protrusion (not shown) or a depression (not shown). The protrusion may be made of an organic material or an inorganic material, and may be disposed above or below the field generating electrodes 191 and 270.

Alignment layers 11 and 21 are applied on inner surfaces of the display panels 100 and 200, and may be vertical alignment layers.

The polarizers 12 and 22 are disposed on outer surfaces of the display panels 100 and 200, and polarization axes (X, Y) of the two polarizers 12 and 22 are perpendicular to each other and formed at about 45° with respect to the oblique cutouts 92a and 92b and the oblique portions of the cutouts 71 to 72b. In the case of a reflective liquid crystal display, one of the two polarizers 12 and 22 may be omitted.

The LCD according to an embodiment of the present invention may further include a retardation film (not shown) for compensating retardation of the liquid crystal layer 3. The LCD may further include a lighting unit (backlight unit) (not shown) that emits light to the polarizers 12 and 22, the retardation film, the display panels 100 and 200, and the liquid crystal layer 3.

The liquid crystal layer 3 has a negative dielectric anisotropy, and is oriented such that the major axes of the liquid crystal molecules 310 in the liquid crystal layer 3 are substantially perpendicular to the surfaces of the two display panels 100 and 200 when no electric field is applied. Accordingly, incident light does not pass through the crossed polarizers 12 and 22 and is blocked.

As described above, the liquid crystal layer 3 comprises a liquid crystal composition. In one example, the liquid crystal composition includes the neutral compound not having dielectric anisotropy and the fluorine-containing compound having dielectric anisotropy.

The neutral compound may be one or more selected from the following Formulae I to III.

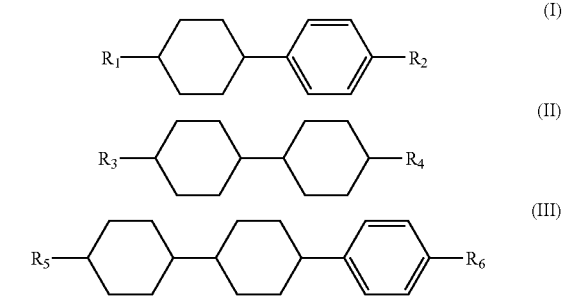

In the above-mentioned Formulae, each of $R_1$ to $R_6$ may contain one selected from an alkyl group, an alkoxy group, or an alkenyl group having $C_1$ to $C_5$. However, it is preferable that the compound having the alkenyl group not be included. When the compound having the alkenyl group is included, it is preferable that the compound containing the alkenyl group be included at about 7 wt % or less of the total content of the liquid crystal composition. As described above, the content of the neutral compound having the alkenyl group may be limited so as to increase a line residual image revelation time.

The fluorine-containing compound may be one or more selected from the following Formulae IV to X.

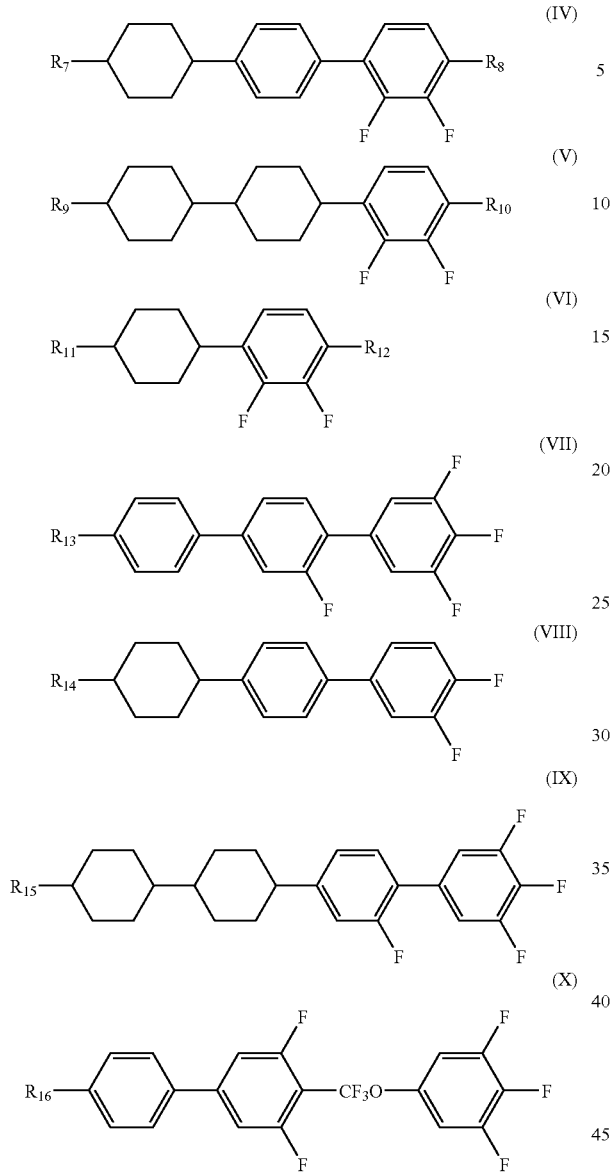

In the above Formulae, $R_7$ to $R_{16}$ may contain one selected from an alkyl group or an alkoxy group having $C_1$ to $C_5$.

The neutral compound may be included at about 20 to 60 wt % of the total content of the liquid crystal composition, and the fluorine-containing compound may be included at about 40 to 80 wt % of the total content of the liquid crystal composition.

In the above-mentioned embodiment of the present invention, only a vertically aligned (VA) mode LCD is described. However, it will be easily understood by those skilled in the art that the present invention can be applied to a horizontally oriented mode liquid crystal display, such as twisted nematic (TN) or horizontal electric field (IPS) display. While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:
1. A liquid crystal composition, comprising:
   a first class including a liquid crystal compound having at least one fluorine atom; and
   a second class including at least one liquid crystal compound represented by one of Formulae I, II, and III,

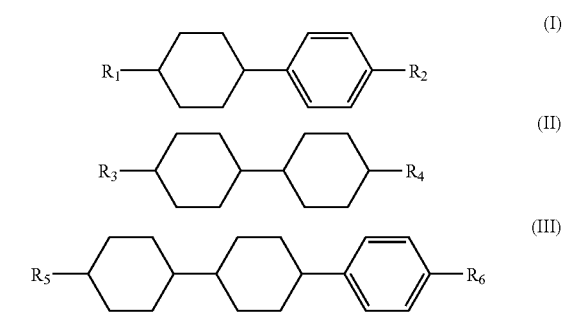

wherein the liquid crystal compounds represented by Formulae I, II, and III have $R_1$ to $R_6$ as terminal groups, which each of $R_1$ to $R_6$ includes one of an alkyl group, an alkoxy group, and an alkenyl group having $C_1$ to $C_5$, further wherein the second class includes a first sub-class and a second sub-class, the first sub-class including a liquid crystal compound not having the alkenyl group in the terminal group thereof, and the second sub-class including a liquid crystal compound having the alkenyl group in the terminal group thereof, wherein the second sub-class is 5 wt % or less of a total content of the first class and the second class, wherein the first class is about 40 to 80 wt % of a total content of the liquid crystal composition and the second class is about 20 to 60 wt % of a total content of the liquid crystal composition, wherein a total amount of the first class and the second class is the same as that of the liquid crystal composition, and wherein the first class includes at least one of the liquid crystal compounds represented by Formulae VII to X

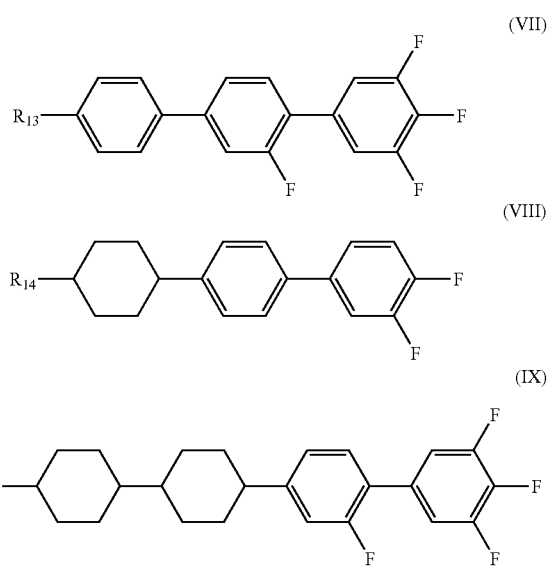

-continued

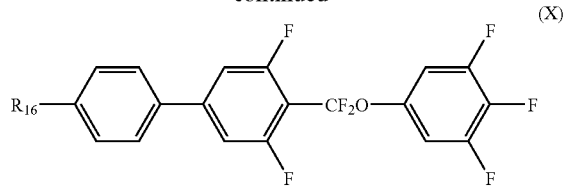

wherein each of $R_{13}$ to $R_{16}$ includes one selected from an alkyl group and an alkoxy group having $C_1$ to $C_5$.

2. A liquid crystal display, comprising:
a first substrate;
a second substrate facing the first substrate;
a pair of field generating electrodes formed on at least one of the first substrate and the second substrate; and
a liquid crystal layer interposed between the first substrate and the second substrate,
wherein the liquid crystal layer comprises a liquid crystal composition that includes:
 a first class including a liquid crystal compound having at least one fluorine atom, and
 a second class including at least one liquid crystal compound represented by one of Formulae I, II, and III,

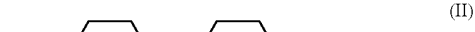

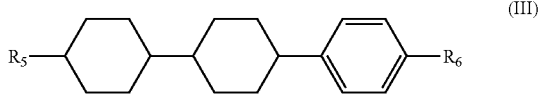

wherein the liquid crystal compounds represented by Formulae I, II, and III have $R_1$ to $R_6$ as terminal groups, which each of $R_1$ to $R_6$ includes one selected from an alkyl group, an alkoxy group, and an alkenyl group having $C_1$ to $C_5$, the second class including a first sub-class and a second sub-class, the first sub-class including a liquid crystal compound not having the alkenyl group in the terminal group thereof, and the second sub-class including a liquid crystal compound having the alkenyl group in the terminal group thereof,
wherein the second sub-class is 5 wt % or less of a total content of the first class and the second class,
wherein the first class is about 40 to 80 wt % of a total content of the liquid crystal composition and the second class is about 20 to 60 wt % of a total content of the liquid crystal composition, and
wherein a total amount of the first class and the second class is the same as that of the liquid crystal composition
wherein the first class includes at least one of the liquid crystal compounds represented by Formulae VII to X

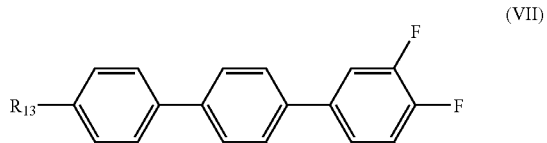

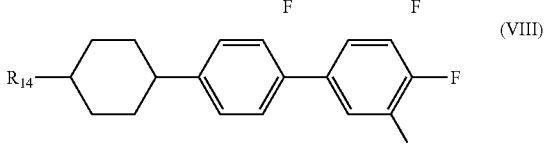

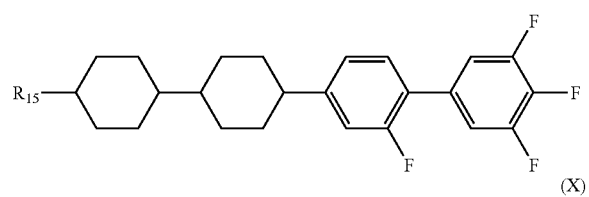

wherein each of $R_{13}$ to $R_{16}$ includes one selected from an alkyl group and an alkoxy group having $C_1$ to $C_5$.

3. The liquid crystal display of claim 2, further comprising:
first and second signal lines that intersect on the first substrate; and
thin film transistors that are connected to the first and second signal lines.

4. The liquid crystal display of claim 3, further comprising:
an inclination direction determining member determining an inclination direction of the liquid crystal compound in the liquid crystal layer.

5. The liquid crystal display of claim 4, wherein
the inclination direction determining member includes a cutout formed in a field generating electrode or a protrusion formed on the field generating electrode.

* * * * *